March 26, 1968     J. W. COX     3,375,023

VELOCIPEDE DRIVING APPARATUS

Filed Nov. 12, 1965     2 Sheets-Sheet 1

INVENTOR.
JAMES W. COX
BY Townsend and Townsend
ATTORNEYS

March 26, 1968 J. W. COX 3,375,023
VELOCIPEDE DRIVING APPARATUS
Filed Nov. 12, 1965 2 Sheets-Sheet 2

INVENTOR.
JAMES W. COX
BY Townsend and Townsend
ATTORNEYS

United States Patent Office 3,375,023
Patented Mar. 26, 1968

3,375,023
VELOCIPEDE DRIVING APPARATUS
James W. Cox, P.O. Box 193, Upper Lake, Calif. 95485
Filed Nov. 12, 1965, Ser. No. 507,419
1 Claim. (Cl. 280—251)

ABSTRACT OF THE DISCLOSURE

A pedal operated drive system for wheeled vehicles wherein the pedals are mounted on levers constrained for alternate pivotable movement. A drive train including a pair of over-running clutches for transmitting the pivotable movement of the levers to unilateral torque at the vehicle wheel.

This invention relates to driving apparatus for bicycles, tricycles and like velocipedes of the type in which the rider actuates pedals for providing motive power thereto, and more particularly to apparatus for transmitting the force applied to the pedals by the rider to the driving wheel of the velocipede.

The specific embodiment of the present invention that is described in detail hereinafter includes in the hub of the driving wheel a pair of unilateral torque transmitting devices exemplified by overrunning clutch mechanisms of the type having a driving member that transmits torque to a driven member in one direction of rotation and which rotates independently of the driven member in the opposite direction of rotation. The driven members of the clutch mechanisms are joined to one another and to the wheel hub and the driving members are connected to pivotally mounted lever arms which lever arms are adapted to be reciprocally actuated by the feet and legs of the rider.

An object of the present invention is to provide driving apparatus which transmits optimum force from the rider's feet and legs to the driving wheel. This object is achieved by providing a pair of pivotally mounted lever arms on which pedals are mounted and by so linking the lever arms to the driving wheel that the rider's legs move through an arc of about 90°. The center of such arc is horizontal, as a consequence of which a major portion of the rider's weight is applied to the pedal during the driving stroke. The present invention in attaining this object, is to be contrasted with conventional prior art drive systems using a chain and sprocket system with a pedal arrangement requiring full rotative movement of the sprocket. In such prior art systems considerable force is wasted, particularly when the two pedals are aligned more or less vertically of one another. At such position little or none of the rider's weight is active in propelling the vehicle. The present invention, by use of lever arms limited to pivotal movement, totally avoids such condition.

Another object is to provide driving apparatus in which the mechanical advantage between the pedals and the driving wheel is substantially infinitely variable. Appreciation of this object can be gained by considering conventional chain and sprocket drive systems wherein complicated and expensive gear-changing mechanisms are necessary for changing the mechanical advantage between the pedals and the driving wheel, i.e., shifting gears. In such prior art devices the selection of gear ratios is at best a compromise between conflicting criteria and not subject to fine adjustments without redesigning and changing a plurality of small machined gears. The present invention eliminates the foregoing by providing a flexible tension member (e.g., a belt or cable) between the lever arm and the overrunning clutch mechanism and by further providing a mechanism which permits the point of attachment of the flexible tension member to the lever arm to be varied.

Still another object of this invention is to provide a velocipede driving apparatus capable of delivering more torque to the driving wheel of the vehicle than is possible in conventional chain and sprocket drive systems. Because the driving sprocket in prior art velocipedes must be rotated through 360°, a limit on the length of the pedal arms is imposed by the length and structure of the rider's legs. The present invention by way of comparison avoids such limitation because the pedal carrying arms are mounted only for pivotal movement through an arc of 90° or less. Therefore, a velocipede equipped with the apparatus of the present invention can be successfully operated on steeper slopes than is possible with prior art devices.

A feature and advantage of the present invention is that it eliminates the hazards to the rider's legs and clothing attending conventional chain and sprocket drive mechanisms.

Another feature and advantage of the invention is that it is mechanically simpler, both from a construction standpoint and a maintenance standpoint.

Other objects, features and advantages will become apparent from the following specification and accompanying drawings in which.

Figure 1:
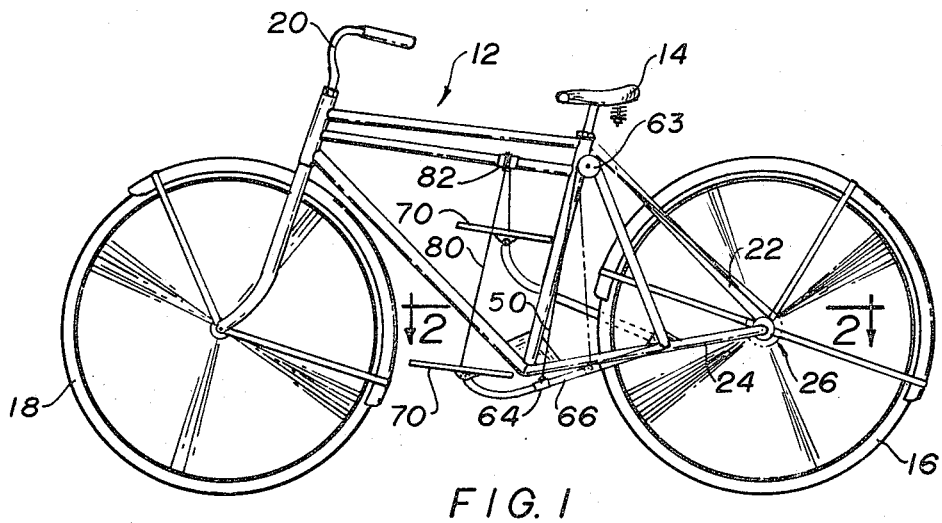
FIG. 1 is a side elevation view of a bicycle equipped with the drive apparatus of the present invention.

Referring more particularly to the drawings, reference numeral 12 indicates a bicycle frame of generally conventional form having a rider supporting seat 14, a rear driving wheel 16, a forward steerable wheel 18, and handlebars 20 for steering the steering wheel 18. Frame 12 includes rearwardly extending frame members 22 and 24 which intersect at the center or hub 26 of driving wheel 16.

Figure 5:
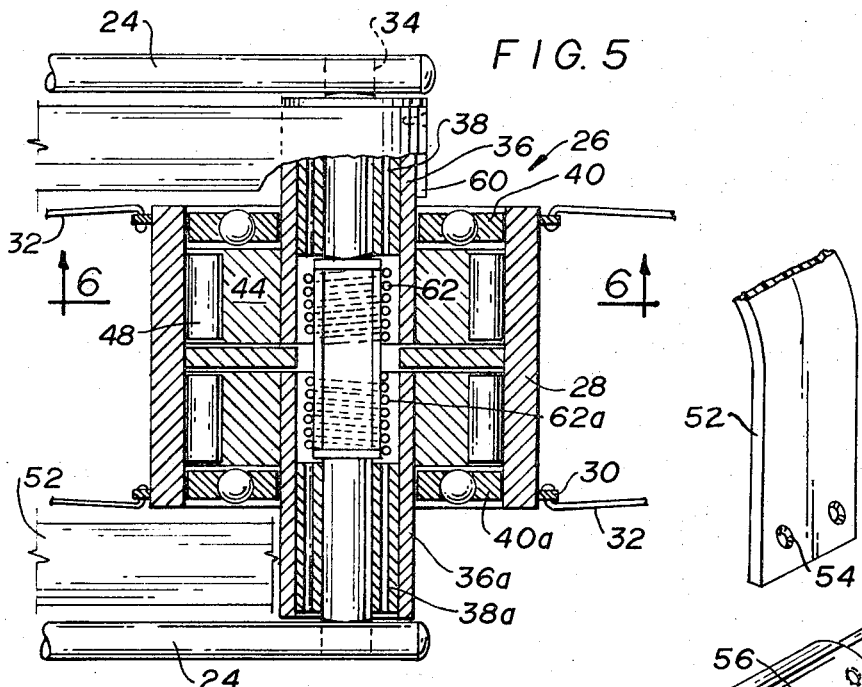
FIG. 5 is a plan view in cross section at greatly enlarged scale of a driving wheel hub constructed according to this invention.

In FIG. 5 hub 26 is shown to include a cylindric member 28 having on the exterior surface thereof apertured radial projections 30 for securing spokes 32 thereto in accordance with conventional practices. A shaft 34 spans the points of intersection of frame members 22 and 24 on opposite sides of the vehicle and serves to mount the driving wheel onto the bicycle frame. Sleeves 36 and 36a are mounted for rotation on shaft 34 by needle bearings 38 and 38a, respectively. As seen clearly in FIG. 5, sleeves 36 and 36a are mounted in side-by-side relation on shaft 34 and extend exteriorly of hub cylinder 28.

Hub 28 is supported for rotation relative sleeves 36 and 36a by ball bearings 40 and 40a, which bearings space the interior surface of hub cylinder 28 from the exterior surface of sleeves 36 and 36a to house a unilateral torque transmitting device, for example, an overrunning clutch mechanism 42 of conventional form.

In the present specification and claims the term "unilateral torque transmitting device" is used to denote mechanical assemblies that include a rotatable driving member and a rotatable driven member which are co-operatively associated so that the driving member drives the driven member in one direction of rotation and rotates independently of the driven member in the other direction of rotation. Ratchet mechanisms and overrunning clutches exemplify "unilateral torque transmitting devices."

Figure 6:
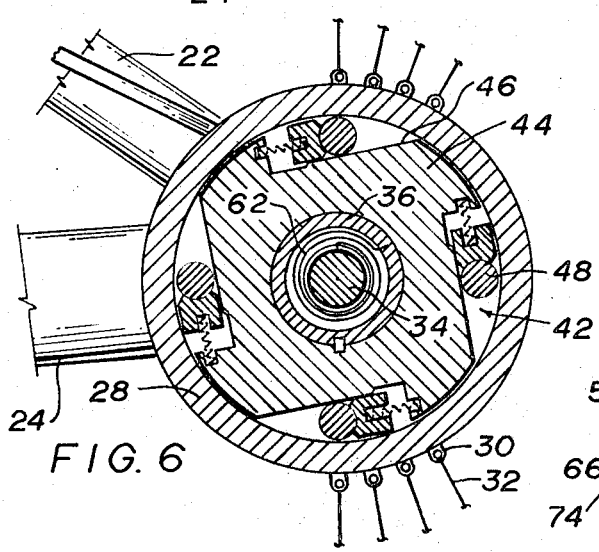
FIG. 6 is a sectional view of the hub taken substantially along line 6—6 of FIG. 5.

As is typical in overrunning clutch mechanisms, a central driving portion 44 is keyed to sleeve 36 and defines one or more planar cam surfaces 46 which converge in one direction of rotation with the internal cylindric surface of hub cylinder 28, the portion of hub cylinder 28 defining such surface constituting the driven member of the clutch. Spring loaded rollers 48 are interposed between planar cam surface 46 and the internal cylindric surface of hub 28 so that when sleeve 36 urges central body portion 44 in a counterclockwise direction as viewed in FIG. 6, hub cylinder 28 will be driven in such direction because rollers 48 wedge between the driving and driven members of the clutch. When sleeve 36 urges central clutch body member 44 in a clockwise direction, however, the central body portion rotates independent of hub cylinder 28. Thus, it will be seen that hub cylinder 28, and consequently driving wheel 16, will be driven only in a forward direction when sleeve 36 is driven in alternate forward and rearward directions.

Figure 7:
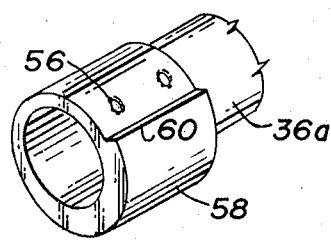
FIG. 7 is an exploded view in perspective of one satisfactory technique for securing the flexible tension member of this invention to the hub sleeve.

Sleeves 36 and 36a are driven in alternate forward and rearward directions in response to leg movements of the rider through a linkage constituting a part of this invention. Such linkage includes flexible tension member 50 secured to the portion of sleeve 36, 36a, that extends exterior of hub cylinder 28. Flexible tension member 50 can be embodied in a flat belt 52 (see FIG. 7) having one or more holes 54 on the end thereof for receiving screws or like fasteners which are threaded in tapped holes 56 in the sleeve. In this particular embodiment sleeve 36a preferably includes a convoluted portion 58 which defines a shoulder 60 having a radial dimension equal to the thickness of belt 52, so that belt 52 will be wound onto sleeve 36a in a smooth manner. Interior of each sleeve 36, 36a a spring 62, 62a is mounted in circumscribing relation to shaft 34 for biasing the respective sleeves in a clockwise direction as viewed in FIG. 6, i.e., a direction to wind flexible tension member 50 onto the sleeve.

For applying tension to flexible tension member 50, thereby applying driving force to driving wheel 16, the flexible tension members are passed over rollers or sheaves 63 and attached at 64 to a lever arm 66 that is pivotally mounted to frame member 24 at 68. Lever arm 66 is provided at the free end thereof with pedals 70 for receiving the rider's foot. As can be seen most clearly from FIGS. 1 and 3, downward force on the free end of lever arm 66 applies tension to flexible tension member 50 and therefore drives sleeve 36 in a counterclockwise direction as viewed in FIG. 6. Such movement of sleeve 36 is transmitted to the driving wheel 16 through the unilateral torque transmitting device as described above.

Figure 7A:
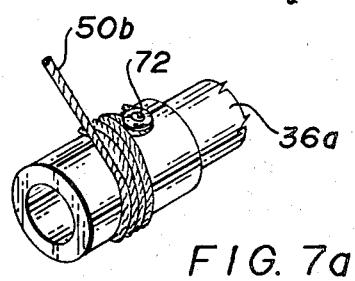
FIG. 7a is a perspective view of another satisfactory technique for securing the flexible tension member to the sleeve.

A full equivalent of belt 52 is shown in FIG. 7a as a flexible cable 50b of steel or the like which is secured to the exterior portion of sleeve 36a by a screw 72 or the like and spirally wound around the sleeve as shown.

Figure 2:
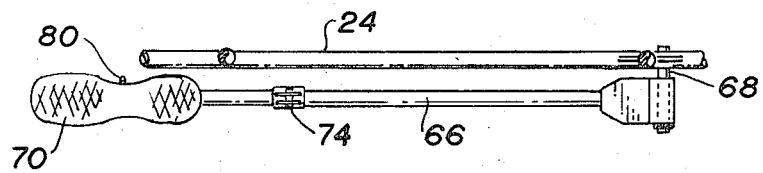
FIG. 2 is a partial plan view in cross section taken substantially along line 2—2 of FIG. 1 and drawn to enlarged scale.
Figure 3:
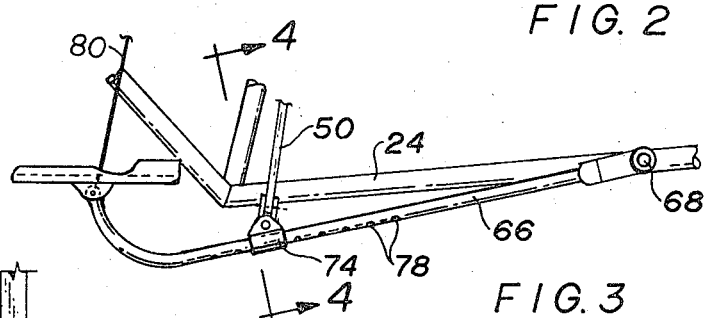
FIG. 3 is a side elevation view of FIG. 2.
Figure 4:
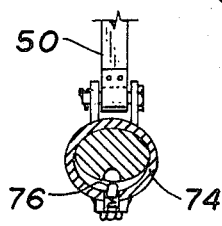
FIG. 4 is a cross sectional view taken along line 4—4 of FIG. 3 and showing one satisfactory expedient for adjusting the mechanical advantage afforded by the present apparatus.

In order to effect variation in the mechanical advantage afforded by the present invention, flexible tension member 50 is attached to lever arm 66 by means of an adjustable connection. Referring to FIGS. 2–4, a satisfactory form of such adjustable connection is shown to include a yoke 74 mounted on lever arm 66 for adjustable sliding movement therealong. A conventional set screw mechanism can be employed for securing yoke 74 to the lever arm in any of an infinite number of locations, or a detent mechanism 76 engageable in any one of a plurality of depressions 78 in lever arm 66 can be employed. It will be appreciated that when flexible tension member 50 is in the position in solid lines in FIG. 1, the mechanical advantage afforded by the present invention is suitable for operation on a level surface, whereas in the position of the flexible tension member shown in broken lines in FIG. 1, the apparatus is suited for hill climbing, since the mechanical advantage is greater as yoke 74 is moved rearwardly.

To assist the rider in applying alternate force to the left side and right side pedals 70, a cable or like flexible member 80 has each of its ends secured to respective lever arms adjacent pedals 70 and its center portion supported and guided for substantially unrestricted movement with respect to frame 12. A guide bearing 82 is mounted on frame 12 for this purpose. Accordingly, it will be appreciated that when the rider applies force on the right side pedal 70, part of the force will assist in raising the left pedal; when the left pedal is so raised spring 62a rewinds flexible tension member 50 onto sleeve 36a.

Figure 8:
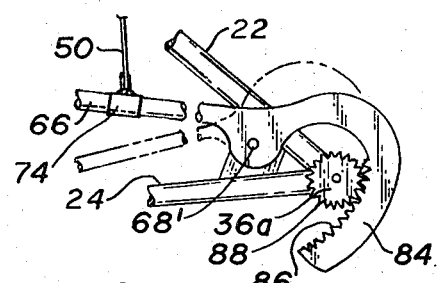
FIG. 8 is a fragmentary side elevation view of an alternate structure for linking the lever arm to the driving wheel hub mechanism.

An alternate embodiment of my invention is shown in FIG. 8 wherein lever arm 66 is provided with an extension 84 which is spaced from pivot point 68'. Extension 84 includes an arcuate rack 86. Sleeve 36a is formed with a pinion 88, the teeth of which are enmeshed with the teeth of rack 86. Thus, it will be seen that as lever arm 66 is pivotally driven by the legs and feet of the rider, sleeve 36a will be driven in alternate rotational directions and power will be supplied to driving wheel 16 through the unilateral torque transmitting device in the manner described hereinabove. Because lever arm 66 as shown in FIG. 8 is identical in all other respects to the same element in FIG. 2 further details thereof are not shown.

Although two embodiments of my invention have been shown and described, it will be apparent that other adaptations and modifications can be made without departing from the true spirit and scope of the invention.

I claim:

1. In combination with a velocipede of the type having a frame, a driving wheel mounted on the frame, and a rider supporting seat secured to the frame, improved driving apparatus comprising a hub for said wheel defining an internal cylindric surface, a left-hand and a right-hand unilateral torque transmitting device in juxtaposition within said hub and adapted for cooperation with said cylindric surface, a shaft attached to said frame and extending through said torque transmitting devices, means for supporting said torque transmitting devices on said shaft for rotation relative to said shaft and relative to one another, each said torque transmitting device including a sleeve that has a first end residing within said hub and a second end projecting from said hub, a central body member that defines at least one ramp that converges toward said internal cylindric surface, a roller on said ramp, means for biasing the roller into wedged engagement between the ramp and the cylindric surface during forward rotative movement of said central body portion so that on application of forward rotative movement to said sleeve said hub and the wheel are driven, and spring means for resiliently biasing said sleeve in a reverse rotative direction, right-hand and left-hand flexible tension members each having a first end secured to each sleeve exterior said hub, each said flexible member having a second end remote from said first end, and means for alternately applying tension to respective said flexible members in a direction opposite the force of said spring means, last said means including right-hand and left-hand lever arms mounted at one end thereof for pivotal movement with respect to said frame, the free ends of said levers being accessible for reciprocable driving pivotable movement by rider on the seat, and means for connecting the second end of respective said flexible tension members to the respective said lever arms, said connecting means being adjustable so that the position of attachment of said second end to said lever arm can be varied to effect varying force multiplication.

References Cited

UNITED STATES PATENTS

| | | | |
|---|---|---|---|
| 512,538 | 1/1894 | Clark et al. | 280—254 |
| 595,661 | 12/1897 | Smith | 74—137 |
| 644,686 | 3/1900 | Runyan et al. | 280—251 |
| 849,342 | 4/1907 | Swinbank | 280—255 X |
| 2,185,698 | 1/1940 | Wright | 280—251 |
| 2,352,672 | 7/1944 | Walter | 280—254 |
| 2,630,333 | 3/1953 | Petersen | 280—255 |
| 3,039,790 | 6/1962 | Trott | 280—251 |

KENNETH H. BETTS, *Primary Examiner.*